United States Patent
Agrawal et al.

(10) Patent No.: US 12,367,187 B2
(45) Date of Patent: Jul. 22, 2025

(54) DISTRIBUTED DATABASE LOCKING

(71) Applicant: Salesforce, Inc., San Francisco, CA (US)

(72) Inventors: Atish Agrawal, Seattle, WA (US); Jameison Bear Martin, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 65 days.

(21) Appl. No.: 18/521,764

(22) Filed: Nov. 28, 2023

(65) Prior Publication Data
US 2025/0173324 A1    May 29, 2025

(51) Int. Cl.
G06F 16/20    (2019.01)
G06F 16/23    (2019.01)

(52) U.S. Cl.
CPC ...... *G06F 16/2343* (2019.01); *G06F 16/2358* (2019.01)

(58) Field of Classification Search
None
See application file for complete search history.

(56) References Cited

U.S. PATENT DOCUMENTS

| | | | |
|---|---|---|---|
| 5,983,225 A * | 11/1999 | Anfindsen | G06F 16/2343 710/200 |
| 6,044,404 A * | 3/2000 | Holdsworth | G06F 9/52 709/229 |
| 8,161,018 B2 | 4/2012 | Walker | |
| 9,389,907 B2 | 7/2016 | Little et al. | |
| 9,400,829 B2 | 7/2016 | Shadmon | |
| 2006/0184528 A1 * | 8/2006 | Rodeh | G06F 16/27 |
| 2007/0043728 A1 * | 2/2007 | Chan | G06F 11/2033 714/E11.073 |
| 2013/0262423 A1 * | 10/2013 | Graefe | G06F 16/2343 707/703 |
| 2018/0067979 A1 | 3/2018 | Wu et al. | |

* cited by examiner

*Primary Examiner* — Belix M Ortiz Ditren
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to orchestrating locking between database nodes of a database system. A database node can determine that an execution of a database transaction at the database node involves acquiring a lock. The database node acquires, from a separate lease manager node, a lease object that permits the database node to create the lock for the database transaction. As a part of provisioning that lease object to the database node, the lease manager node ensures that a lease object for creating locks that conflict with the lock is not held by another database node. The database node creates the lock for the database transaction based on the acquired lease object. As a part of creating that lock, the database node ensures that the lock does not conflict with a lock held by another database transaction executing at the database node.

20 Claims, 9 Drawing Sheets

DISTRIBUTED DATABASE LOCKING

BACKGROUND

Technical Field

This disclosure relates generally to a database system and, more specifically, to various mechanisms for orchestrating locking between database nodes of the database system.

Description of the Related Art

Enterprises routinely implement database management systems (or, simply "database systems") that enable users to store a collection of information in an organized manner that can be efficiently accessed and manipulated. During operation, a database system receives requests from users via applications or from other systems, such as another database system, to perform database transactions on data stored in a database of the database system. As part of performing a database transaction, the database system may obtain a lock on a database table (or a different type of database object) that allows for the database system to manipulate data of that database table. Such a lock can prevent the database system from processing other database transactions against the database table while the initial database transaction holds the lock. After completing a portion or all of that database transaction, the database system releases that lock so that other database transactions can operate on the database table.

DETAILED DESCRIPTION

Figure 1:
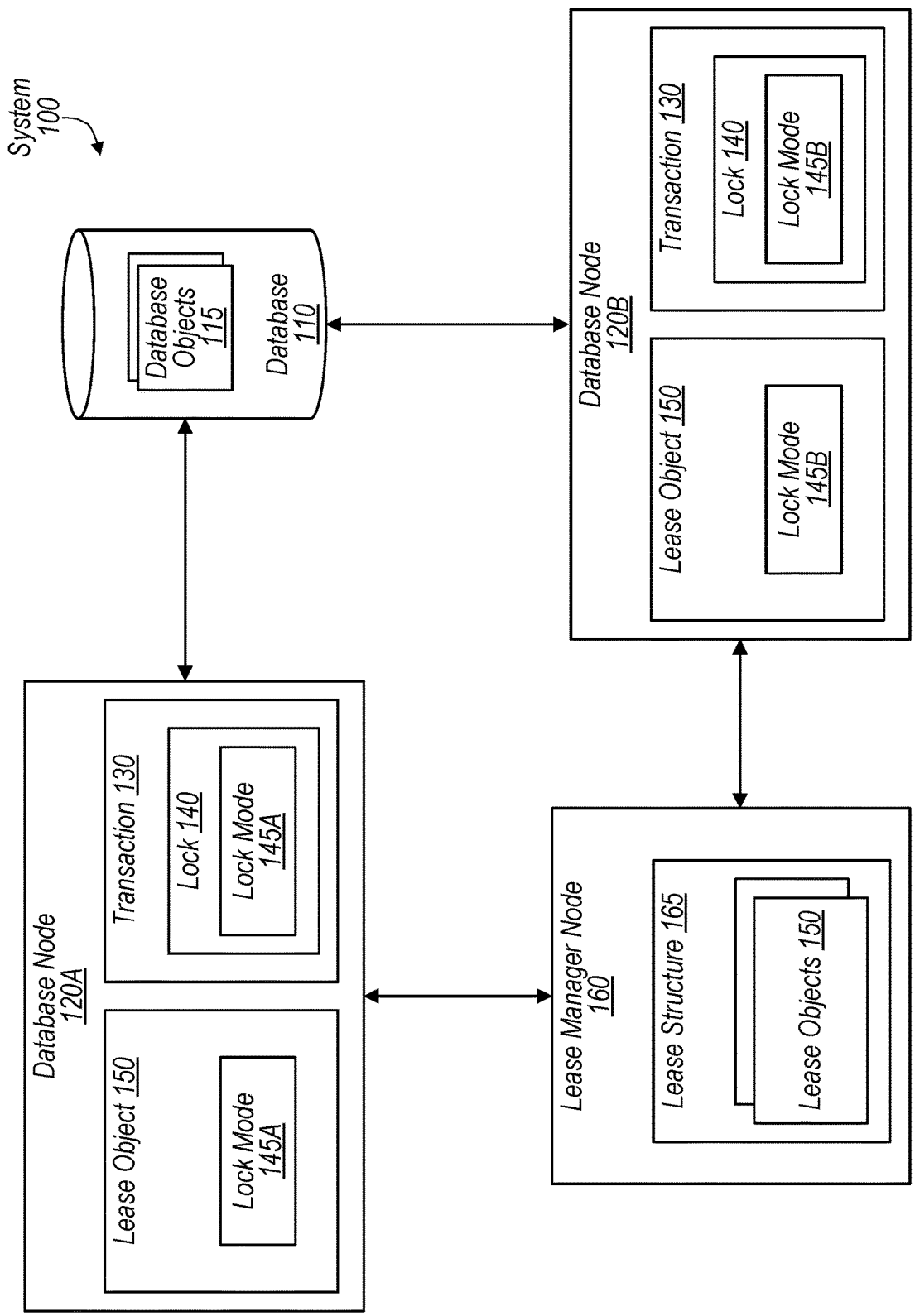
FIG. 1 is a block diagram illustrating example elements of a system comprising database nodes and a lease manager node that provisions lease objects to the database nodes for creating locks, according to some embodiments.

Database systems typically include a single write database node that processes database transactions to read and write data—the database systems can also include read database nodes that process read-only transactions. When executing a database transaction, the write database node often acquires a lock on a database object to either prevent the database object from being changed while read or so that the write database node can update/delete data stored within the database object without causing data inconsistency issues. The write database node can process multiple transactions concurrently and thus, under conventional approaches, implements a lock manager to manage locks for those transactions so that they do not take conflicting locks (e.g., to prevent two transactions from taking the same type of lock on the same object). But database systems are shifting towards a write-scale approach in which there are multiple write database nodes that process database transactions to read and write data. It is desirable to ensure that the database nodes do not take conflicting locks between each other for their database transactions. The forementioned local lock manager handles locks within a database node where it executes, but it does not provide any mechanism to handle inter-node locks between database nodes, and thus it cannot ensure that the database nodes do not take conflicting locks.

One potential approach to orchestrate locking between databases nodes is to broadcast lock acquisitions to each other. In particular, when a given database node acquires a lock on a database object, it notifies the other database nodes about that lock. Each database node tracks what locks have been acquired so that it can avoid taking a conflicting lock. But there are issues with this approach. For example, broadcasting to every database node becomes quite costly as the number of database nodes in the system increases. Furthermore, when a new database node is added to the system, it has to be informed about all the locks acquired by the other database servers, which is time consuming and resource expensive (e.g., a large number of network calls between database nodes). Thus, such an approach is not sufficient. Accordingly, this disclosure addresses, among other things, the problem of how to manage locking between database nodes in a way that overcomes some or all of the above deficiencies.

In various embodiments described below, a system comprises multiple database nodes and a lease manager node—the lease manager node can be one of those database nodes. During operation, a database node may determine that executing a local database transaction involves acquiring a lock on a particular database object. The database node sends a request to the lease manager node for a lease object that allows for the database node to create the lock. In various embodiments, the lease manager node ensures that a lease object for creating locks that conflict with the lock is not held by another database node. If another database node holds a lease object that permits conflicting locks to be created, the lease manager node may issue a revoke request to that database node to release that lease object. Once there are no lease objects for conflicting locks held by other database nodes, in various embodiments, the lease manager node provisions the lease object to the requesting database node. The requesting database node then creates the lock for the local database transaction as permitted by the acquired lease object. When creating the lock, the database node ensures that the lock does not conflict with any lock held by another local database transaction executing at the database node. The database node may create locks permitted by the acquired lease object for multiple transactions and retain the lease object until the database node is instructed by the lease manager to release it, or alternatively the database node may voluntarily decide to relinquish the lease object.

These techniques may be advantageous over conventional approaches as the techniques prevent inter-node lock conflicts between multiple database nodes and intra-node lock conflicts between multiple database transactions within a database node. That is, a lease object is a node-level construct that allows a holder of the lease object to create local locks (of a particular lock mode) for its database transactions. Thus, using lease objects avoids conflicts between database nodes while also using locks avoids conflicts between transactions that are executing of a given database node. Furthermore, by having a central authority (the lease manager), database nodes do not have to broadcast lock acquisitions to each other or track the locks that are acquired by other database nodes. Also, when a new database node is added to the system, it does not have to be informed about which locks have been acquired. Instead, when it seeks to acquire a lease object to create certain locks, it can acquire that lease object from the lease manager node who ensures that no other database node has permission to create a conflicting lock.

Turning now to FIG. 1, a block diagram of a system 100 is shown. System 100 includes a set of components that may be implemented via hardware or a combination of hardware and software routines. In the illustrated embodiment, system 100 includes a database 110, database nodes 120A-B, and a lease manager node 160. Also as shown, database 110 includes database objects 115, database nodes 120 execute transactions 130 (with locks 140 having lock modes 145) and include lease objects 150, and lease manager node 160 includes a lease structure 165. The illustrated embodiment may be implemented differently than shown. As an example, lease manager node 160 may also be a database node that executes transactions 130.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and other entities associated with system 100. In various embodiments, system 100 is implemented using a cloud infrastructure provided by a cloud provider. Thus, database 110, database nodes 120, and lease manager node 160 may utilize the available cloud resources of that cloud infrastructure (e.g., computing resources, storage resources, etc.) in order to facilitate their operation. For example, software for implementing a database node 120 might be stored on a non-transitory computer-readable medium of server-based hardware included in a datacenter of the cloud provider and executed in a virtual machine hosted on that hardware. In some embodiments, database nodes 120 and lease manager node 160 are implemented without the assistance of a virtual machine or other deployment technologies, such as containerization. System 100 may be implemented using local or private infrastructure as opposed to a public cloud.

Database 110, in various embodiments, is a collection of information that is organized in a manner that allows for access, storage, and/or manipulation of that information. Database 110 may include supporting software (e.g., storage nodes) that enable database nodes 120 to carry out those operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. In various embodiments, data written to database 110 by a database node 120 is accessible to other database nodes 120 within a multi-node configuration.

In various embodiments, data is stored at database 110 in records included in database objects 115. Examples of database objects 115 include, but are not limited to, tables, indexes, stored procedures, sequences, views, and user-defined locks, such as advisory locks, which can be used in a PostgreSQL-based database. Accordingly, one database object 115 (e.g., an index) can be created based on another database object 115 (e.g., a table). In some embodiments, there may be custom database objects 115—e.g., a tenant object that represents a tenant and includes data about that tenant. Database objects 115 may be shared by multiple tenants (e.g., a database object 115 may include data from those tenants, but the data is logically separated using tenant identifiers) or database objects 115 may be tenant specific.

A database node 120, in various embodiments, provides database services, such as data storage, data retrieval, and/or data manipulation. In various embodiments, a database node 120 is software that is executable on hardware, while in some embodiments, it encompasses both the hardware and the software. The database services may be provided to other components in system 100 or to components external to system 100. As an example, a database node 120 may receive a request from an application node (not shown) to perform a database transaction 130. A database transaction 130, in various embodiments, is a logical unit of work (e.g., a specified set of database operations) to be performed in relation to database 110. For example, executing a database transaction may include executing an SQL SELECT statement to select one or more rows from one or more tables (database objects 115). The contents of a row may be specified in a record, and thus a database node 120 may return one or more records corresponding to the one or more rows.

Performing a database transaction 130 can include a database node 120 writing records and/or deleting records of database 110. In various embodiments, a database node 120 initially writes records to a local in-memory cache before flushing them to database 110 after they have been committed. As used herein, the phrase "committing a transaction" is used in accordance with its well-understood meaning and refers to the process of causing changes made during the transaction to be saved and made visible outside of the entity performing the transaction. As a part of executing a database transaction 130, a database node 120 may acquire locks 140 based on the types of operations to be performed and the database objects 115 on which the operations will be performed.

A lock 140, in various embodiments, is a construct used to protect a database resource (e.g., a database object 115) from being manipulated by another entity other than the holder of that lock 140. A lock 140 may take the form of a record that is stored in a lock structure (e.g., a table). In various embodiments, a lock 140 is acquired on a particular database resource and has a particular lock mode 145. The database resource can correspond to a database object 115 (e.g., a table) or a subcomponent of that database object 115 (e.g., a record/row of the database table). While locks 140 are discussed as locking at the database object or subcomponent level, the techniques discussed herein can be extended to other levels (e.g., database level, file level, page level, etc.). In some instances, a lock 140 may be acquired on multiple database resources (e.g., a table and an index that is built on that table). Also, locks 140 may be acquired on a per-statement basis (e.g., for each database statement of a database transaction 130), on a per-transaction basis, and on a per-session basis where the scope of a lock 140 can span multiple database transactions 130.

A lock mode 145, in various embodiments, defines the strength of a corresponding lock 140 and is determined based on the types of operations that will be performed on the database resource. Examples of lock modes 145 can include, but are not limited to, the lock modes that are used in Postgres, such as access share, row share, row exclusive, access exclusive, etc. For example, a database transaction 130 may include a SELECT statement to access a set of records from a particular database table. Accordingly, a database node 120 may acquire an access share lock 140 on that database table to prevent it from being changed or deleted while those records are read. In various embodiments, there are various degrees in lock strength, where a weaker lock 140 may allow for more concurrent activity than a stronger lock 140. In some cases, the weakest lock 140 may allow full concurrent access to a database object 115 while the strongest lock 140 may provide exclusive access (i.e., only the holder of the lock can access/modify the database object 115 while the strongest lock 140 is held). In various embodiments, the strength of a lock 140 is determined/defined by the lock mode 145 of that lock 140.

Locks 140 can conflict with one another. For example, in Postgres, an access exclusive lock 140 and an access share lock 140 cannot be acquired on the same database object 115 at the same time—i.e., the database object cannot be exclusively locked while allowing shared access. As a result of lock modes 145 having different strengthens and conflicting differently, in various embodiments, a database node 120 implements a local lock manager to ensure that conflicting locks 140 are not held by database transactions 130 executing on that database node 120. For example, if a first database transaction 130 acquires an access exclusive lock 140 on a particular database object 115, then the local lock manager prevents a second transaction 130 from acquiring an access share lock 140 on that database object 115 while the access exclusive lock 140 is held by that first database transaction 130. Once that access exclusive lock 140 is released by the first database transaction 130, the local lock manager may provide the access share lock 140 to the second database transaction 130. In some cases, locks 140 of the same or different lock mode 145 may be acquired by multiple database transactions 130—e.g., multiple database transactions 130 may acquire access share locks 140 on the same database object 115. In order to create a lock 140 of a certain lock mode 145 on a particular database object 115, in various embodiments, a database node 120 obtains permission from lease manager node 160 in the form of a lease object 150.

A lease object 150 (or a "lease"), in various embodiments, is a node-level construct that permits a holder of that lease object 150 to create, for its database transactions 130, local locks 140 (a transaction level construct) of a particular lock mode 145 on a particular database object 115. Accordingly, a lease object 150 can be used to prevent locking conflicts between database nodes 120 while locks 140 can be used to avoid conflicts between transactions 130 executing on a database node 120. Once a lease object 150 has been acquired, a database node 120 may create locks 140 of the particular lock mode 145 on the particular database object 115 until that lease object 150 expires or is revoked. To acquire a lease object 150, in various embodiments, a database node 120 issues a lease request to lease manager node 160.

Lease manager node 160, in various embodiments, orchestrates the allocation of lease objects 150 in a manner that avoids locking conflicts. In various embodiments, lease manager node 160 is software executable on hardware while in some embodiments, it encompasses both the hardware and the software. To facilitate the allocation of lease objects 150, lease manager node 160 maintains lease structure 165, which may store information identifying lease objects 150 that have been allocated and to which database nodes 120. When a lease request has been received from a database node 120 for a lease object 150, lease manager node 160 may utilize lease structure 165 to determine if there is an already-provisioned lease object 150 that conflicts with the requested lease object 150 in order to ensure that different database nodes 120 do not hold lease objects 150 that allow for conflicting locks 140 to be created between those database nodes 120 at the same time.

If a conflicting lease object 150 is held by another database node 120, then, in various embodiments, lease manager node 160 issues a request to that database node 120 to release the conflicting lease object 150. For example, database node 120A may issue a request for a lease object 150 that permits locks 140 of a lock mode 145A (e.g., an access exclusive mode) to be created by database node 120A on a certain database object 115. In response to receiving that request, lease manager node 160 may determine that database node 120B holds a lease object 150 for creating, on that particular database object 115, locks 140 of a lock mode 145B (e.g., an access share mode) that conflicts with lock mode 145A. Consequently, lease manager node 160 may issue a request to database node 120B to release that lease object 150, and subsequent to releasing the lease object 150, database node 120B may return an acknowledgement. Lease manager node 160, in various embodiments, then provisions the requested lease object 150 to database node 120A. If a conflicting lease object 150 is not held by another database node 120, then lease manager node 160 provisions the requested lease object 150 without having to send a release request to a database node 120. Because requests for lease objects 150 flow through lease manager node 160 in various embodiments, lease manager node 160 may ensure that no conflicting lease objects 150 are held by different database nodes 120. Example scenarios that relate to the provisioning and/or revocation of lease objects 150 are discussed in greater detail with respect to FIGS. 4A-B.

Figure 2:
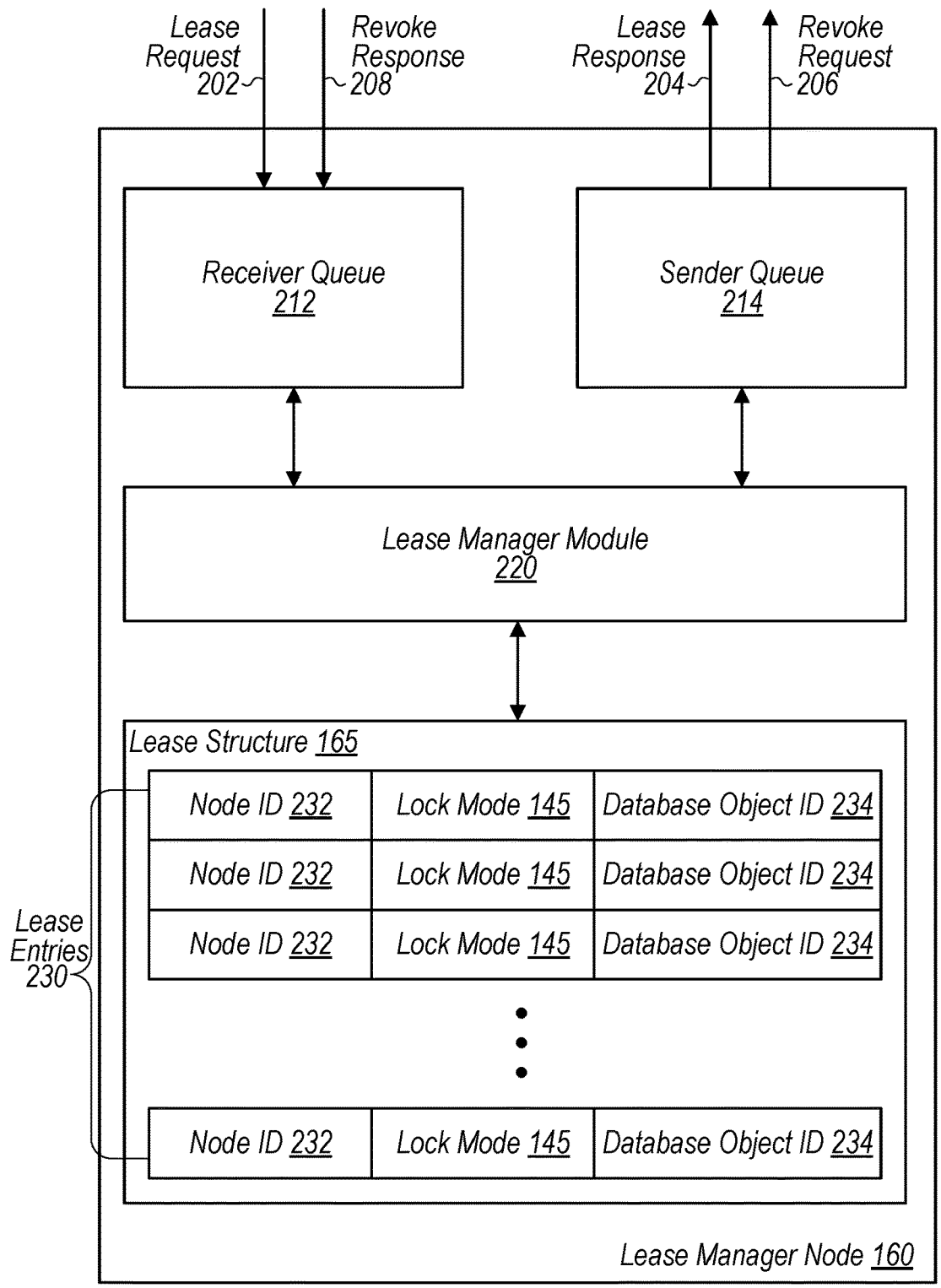
FIG. 2 is a block diagram illustrating example elements of a lease manager node that is capable of provisioning lease objects, according to some embodiments.

Turning now to FIG. 2, a block diagram of lease manager node 160 is depicted. In the illustrated embodiment, lease manager node 160 includes lease structure 165, a receiver queue 212, a sender queue 214, and a lease manager engine 220. Also as shown, lease structure 165 comprises lease entries 230 that each identify one or more node IDs 232, a lock mode 145, and a database object ID 234. The illustrated embodiment might be implemented differently than shown. For example, lease manager node 160 may not utilize two separate queues for sending and receiving requests.

Receiver queue 212 and sender queue 214, in various embodiments, are data structures that are used to store requests that are being received or sent out, respectively-receiver queue 212 and sender queue 214 may take the form of message queues used in an asynchronous node-to-node communication protocol. As such, receiver queue 212 may be used to store incoming lease requests 202 for lease objects 150 and responses/acknowledgements from database nodes 120 (e.g., a revoke response 208), and sender queue 214 may be used to send revoke requests to database nodes 120 to release lease objects 150 and responses to database nodes 120 (e.g., a lease response 204). Requests and responses may be processed reliably from receiver queue 212 and sender queue 214 such that similar guarantees are provided as those provided in the Transmission Control Protocol (TCP). In various embodiments, lease requests 202 and lease responses 204 are processed in the order in which they are pushed into queues 212 and 214. Revoke requests 206 and revoke responses 208 may be processed out of order relative to the order in which they are pushed into queues 212 and 214. The out-of-order processing may be allowed as lease upgrades during a transaction 130 might involve out-of-order processing. In some instances, out-of-order processing may be allowed for all requests (e.g., lease requests 202, revoke requests 206, etc.) in order to avoid deadlock scenarios. While not shown, in some embodiments, lease manager node 160 includes a respective receive queue 212 and a respective sender queue 214 for each of the different types (e.g., lease, revoke, etc.) of requests/responses.

Lease manager module 220, in various embodiments, is software that is executable to orchestrate the allocation of lease objects 150. In various embodiments, lease manager module 220 is implemented via a set of worker processes that can be stateless. In particular, a stateless worker process may process requests (e.g., lease requests 202) and persist the results in a shared memory (e.g., corresponding to lease structure 165) while temporarily storing data in a private memory during the processing of a request (i.e., for the duration of the processing). As a result of using stateless worker processes, a database node 120 may not be bound to a worker process such that the database node 120 has to send requests and responses to the same process. Instead, a database node 120 may receive, for example, a revoke request 206 from a first worker process to release a lease object 150 and send a revoke response 208 to lease manager node 160 that is subsequently processed by a second worker process. In order to process lease requests 202 and ensure that lock conflicts are avoided, in various embodiments, lease manager module 220 uses lease structure 165 (which may be a table) to track allocated lease objects 150.

As mentioned, in various embodiments, lease structure 165 stores, in lease entries 230, information about allocated lease objects 150. A given lease object 150 can be allocated to one or more database nodes 120 and thus a lease entry 230 may specify one or more node IDs 232 corresponding to those database nodes 120. A node ID 232, in various embodiments, is a value that is indicative of a particular database node 120 within system 100. In addition to specifying node IDs 232, a lease entry 230 specifies a lock mode 145 that indicates what type of lock 140 can be created under the corresponding lease object 150 and a set of database objects IDs 234 corresponding to the database objects 115 that are being locked under the corresponding lease object 150. When a lease object 150 is first allocated, in various embodiments, lease manager module 220 creates a corresponding entry 230 in lease structure 165. If that lease object 150 is subsequently allocated to additional database nodes 120, then lease manager module 220 may update the corresponding entry 230 to identify the additional database nodes 120 (i.e., add their node IDs 232). When a revoke response 208 is received that indicates that a lease object 150 has been released, in various embodiments, lease manager module 220 deletes a corresponding entry 230 in lease structure 165. If multiple database nodes 120 are associated with that lease object 150, then lease manager module 220 may update the corresponding entry 230 to remove the database node 120 associated with the received revoke response 208. If no database nodes 120 are associated with the lease object 150, then the corresponding entry 230 may be deleted by lease manager module 220.

While not shown, a lease entry 230 may also store information identifying the type of database object 115 (or database construct) that is associated with a lease object 150. Examples of the different types include relation, object, page, transaction, advisory, and function. As an example, a database node 120 may issue a lease request 202 for a lease object 150 on a database function. Consequently, lease manager module 220 may create an entry 230 that specifies the ID of that function and its type (i.e., function). A lease entry 230 may further store information describing an expiration time or existence duration that is indicative of when the corresponding lease object 150 becomes invalid (in some embodiments in which a lease object 150 can expire after issuance).

During operation, lease manager module 220 may receive, from a database node 120, a lease request 202 for a lease object 150 of a particular lock mode 145 on a particular database object 115. In response to receiving that lease request, in various embodiments, lease manager module 220 checks for any lease objects 150 that have been allocated to another database node 120 and can be used to create, on the particular database object 115, a lock 140 of a lock mode 145 that conflicts with the requested lock mode 145. In particular, lease manager module 220 may scan lease structure 165 to identify any lease objects 150 that conflict with the requested lease object 150 according to a lock mode conflict table. If a conflicting lease object 150 exists, but is held by the requesting database node 120, in various embodiments, it is not considered to be an issue as the lock manager at the requesting database node 120 can prevent conflicting locks 140 from being created in the event that multiple conflicting lease objects 150 are granted to that database node 120. For each conflicting lease object 150 that is held by another database node 120, lease manage module 220 may add the associated database node 120 to a revocation list along with an indication of the conflicting lease object 150.

After locating conflicting lease objects 150 and creating the revocation list, in various embodiments, lease manager module 220 then sends a revoke request 206 to the database nodes 120 on the revocation list to release the conflicting lease objects 150. Each database node 120 may release one or more conflicting lease objects 150 (as discussed in more detail with respect to FIG. 3) and return revoke responses 208 indicating that the conflicting lease objects 150 have been released. Once there are no conflicting lease objects 150, then lease manager module 220 may create the requested lease object 150 or otherwise mark that it has been granted and then provide a lease response 204 to the requesting database node 120. That lease response 204 may include the granted lease object 150. If the revocation list is empty, then lease manager module 220 may create the requested lease object 150 without issuing any revoke requests 206.

Figure 3:
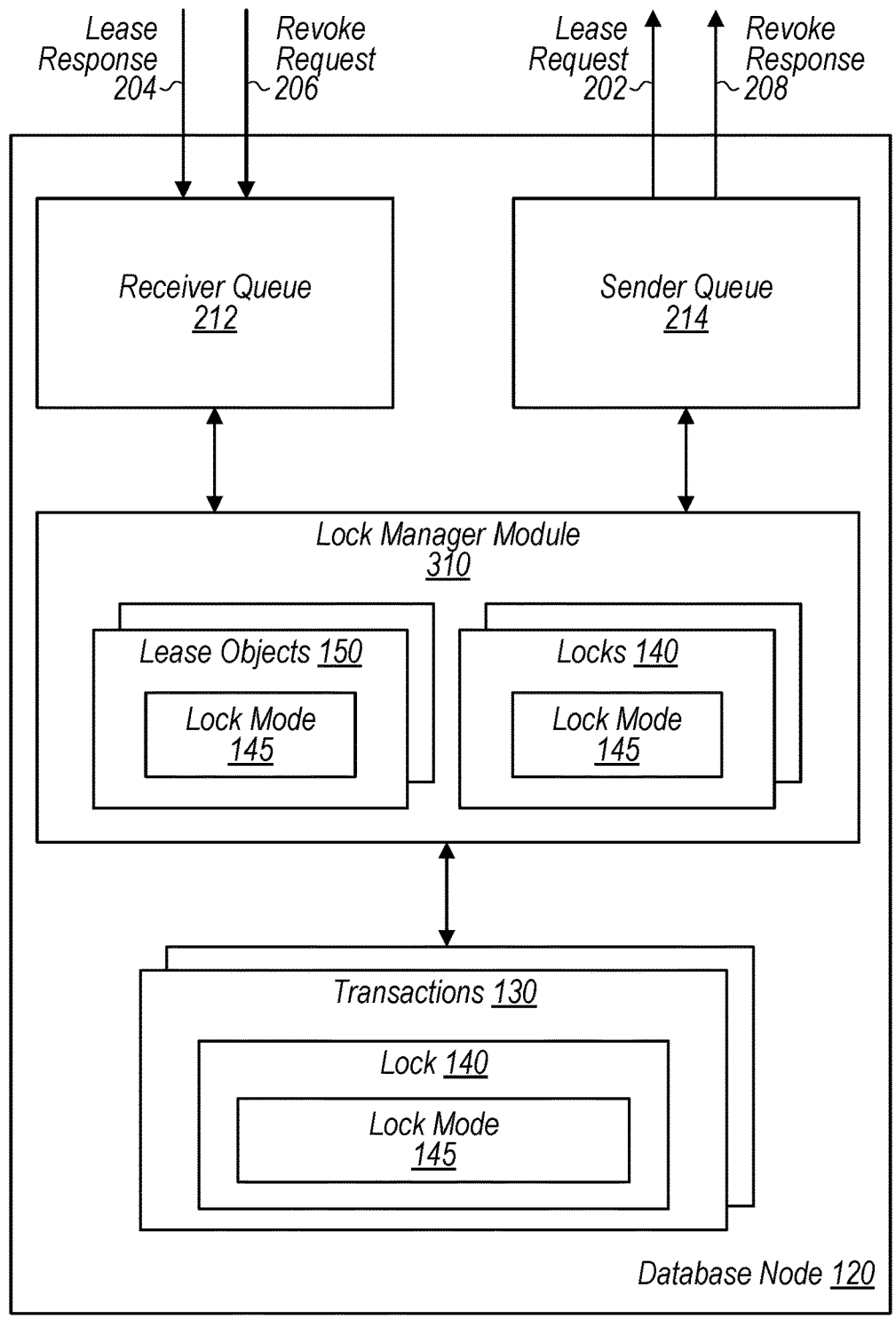
FIG. 3 is a block diagram illustrating example elements of a database node that is capable of obtaining lease objects and creating locks based on those lease objects, according to some embodiments.

Turning now to FIG. 3, a block diagram of an example database node 120 is shown. In the illustrated embodiment, database node 120 comprises a receiver queue 212, a sender queue 214, and a lock manager module 310. As shown, database node 120 executes transactions 130 that utilize locks 140, and lock manager module 310 includes lease objects 150 usable to create those locks 140. The illustrated embodiment might be implemented differently than shown.

As an example, database node 120 may also be lease manager 160 and thus include lease manager module 220.

Lock manager module 310, in various embodiments, is software that is executable to orchestrate the allocation of locks 140 for database transactions 130, including obtaining lease objects 150 to create those locks 140. To manage locks 140 and lease objects 150, lock manager module 310 may include a data structure (e.g., a hash table in memory) that stores information pertaining to allocated locks 140 and lease objects 150—that is, lock manager 310 may use data structures to track the allocated locks 140 and lease objects 150. That information may include information provided by lease manager node 160, such a lease object 150 that describes a lock mode 145 and a database object 115 on which locks 140 of that lock mode 145 can be created. The information stored by lock manager module 310 may be updated as lock manager module 310 processes requests (e.g., a revoke request 206) and responses (e.g., a lease response 204). Similarly to lease manager module 220, lock manager module 310 may process requests and/or responses in the order in which they are pushed into receiver queue 212. In some cases, certain requests and/or responses might be processed out of order in order to avoid potential deadlock scenarios. As a part of processing a transaction 130, lock manager module 310 may implement a lease acquisition process to acquire a lease object 150.

In various embodiments, the lease acquisition process initially begins with a transaction 130 requesting a lock 140 of a particular lock mode 145 on a particular database object 115—e.g., the transaction 130 may request an access share lock 140 on a table prior to reading data from that database table. In response to receiving a request for a lock 140, lock manager module 310 may initially check for conflicting locks 140 (using the information stored about allocated locks 140) and then create the lock 140 if there are no conflicting locks 140. If there is at least one conflicting lock 140, then lock manager module 310 waits for the conflicting lock(s) 140 to be released before creating the requested lock 140. After creating the requested lock 140, in various embodiments, lock manager module 310 then checks for a lease object 150 that permits the creation of that lock 140. Lock manager module 310 may create a lock 140 before checking for a corresponding lease object 150 to avoid a conflict that can arise from a race condition. In particular, if lock manager module 310 checks for a lease object 150 before creating a lock 140 under the lease object 150, then a situation may arise in which that lease object 150 is revoked while the lock 140 is being created. If lock manager module 310 does not recheck for the lease object 150 after creating that lock 140, then an issue can arise in which database node 120 uses a lock 140 that it is not permitted to use as the lease object 150 was revoked, but database node 120 is unaware the effect of the revocation relative to the created lock 140. If after the creation of a lock 140, a lease object 150 for that lock 140 is still held by database node 120, then lock manager module 310 may inform the transaction 130 that the lock 140 is granted. But if after the creation of a lock 140, lock manager module 310 does not locate an associated lease object 150 that grants lock manager module 310 permission to create that lock 140, then lock manager module 310 may proceed to acquire the lease object 150 by issuing a lease request 202 to lease manager node 160 for that lease object 150.

In response to receiving a lease request 202, lease manager node 160 may process the request (as discussed above) and return a lease response 204 having the requested lease object 150. After receiving that lease object 150, lock manager module 310 may perform the process discussed above in which it creates the relevant lock 140 and then checks for the relevant lease object 150 to ensure that it has not been revoked. After being granted the requested lock 140, the database transaction 130 may proceed to perform one or more database operations relating to that lock 140. Once the lock 140 is no longer needed, in various embodiments, a transaction 130 informs lock manager module 310, causing lock manager module 310 to release that lock 140. This may trigger lock manager module 310 to create a lock 140 for a different transaction 130 that has been waiting. While a transaction 130 can cause a lease object 150 to be acquired, in various embodiments, that lease object 150 lives outside of the scope of that transaction 130 and thus persists beyond the end of that transaction 130. As a result, the lease object 150 may be subsequently used to create locks 140 for other transactions 130. Furthermore, a lease object 150 may be stored separately from lock manager module 310 and if lock manager module 310 crashes and is restarted, the stored lease objects 150 may persist and be subsequently used by the new instance of lock manager module 310.

In response to receiving a revoke request 206, in various embodiments, lock manager module 310 implements a lease revocation process. As a part of that lease revocation process, lock manager module 310 may identify any lease objects 150 that conflict with the lease object 150 that lease manager module 220 intends to grant. In some embodiments, the revoke request 206 identifies the lease objects 150 are being revoked by lease manager module 220. After the conflicting lease objects 150 have been identified, lock manager module 310 then releases the lease objects 150 such that they cannot be used to create additional locks 140. After releasing them, in various embodiments, lock manager module 310 then ensures that any locks 140 that were created based on those lease objects 150 are released. A transaction 130 may continue to use a lock 140 until it is no longer needed and then inform that lock manager module 310 that the lock 140 can be released. But in some embodiments, lock manager module 310 may force a transaction 130 to relinquish a lock 140 before that transaction 130 is finished with that lock 140. In various embodiments, lock manager module 220 releases lease objects 150 before their associated locks 140 to prevent the scenario in which lock manager module 310 releases locks 140 and then proceeds to release lease objects 150, and while those lease objects 150 are being released, a new lock 140 is created based on the lease objects 150. After releasing the relevant lease objects 150 and their associated locks 140, lock manager module 310 may return a revoke response 208 to lease manager node 160 to indicate that the issued revoke request 206 has been processed.

Figure 4A:
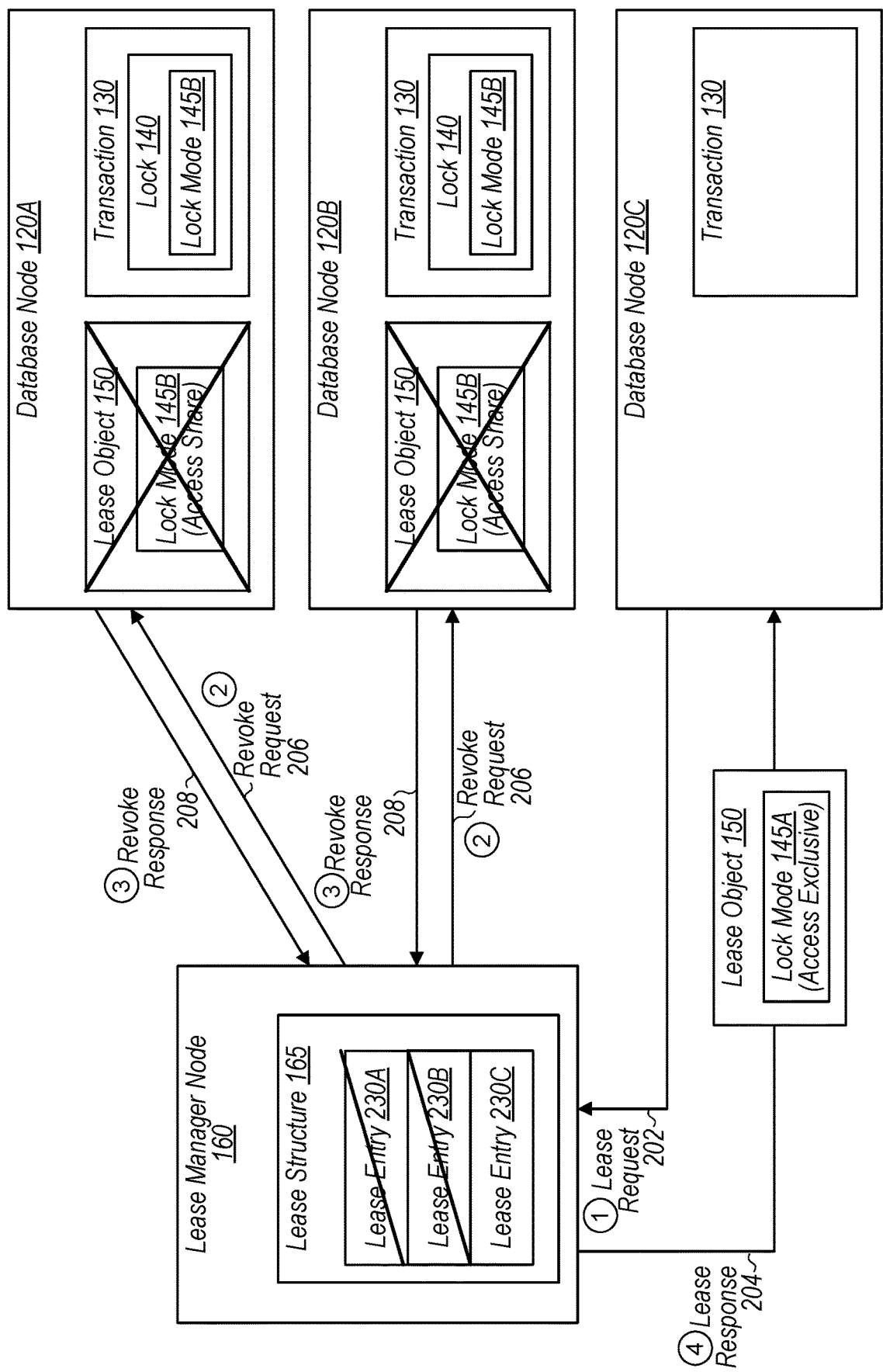
FIGS. 4A-B are block diagrams illustrating various scenarios relating to the provisioning and/or revocation of lease objects, according to some embodiments.

Turning now to FIG. 4A, a block diagram of an example provisioning of a lease object 150 to a database node 120 is shown. In the illustrated embodiment, there are database nodes 120A-C and lease manager node 160. As further shown, database nodes 120A and 120B both initially include a lease object 150 for a lock mode 145B that permits them to create locks 140 of lock mode 145B for their transactions 130. Also as shown, lease manager node 160 includes lease structure 165, which stores a set of lease entries 230. The illustrated embodiment might be implemented differently than shown. For example, only one of the database nodes 120 may include a lease object 150 for lock mode 145B.

During operation, database node 120C can execute a transaction 130 (or a statement of a transaction 130) that requests an access exclusive lock 140 on a certain database object 115. As discussed, database node 120C may provision that access exclusive lock 140 and then check for a lease object 150 that allows for the creation of such a lock 140. In FIG. 4A, database node 120C does not initially include a lease object 150 for creating an access exclusive lock 140 on the particular database object 115. Accordingly, as shown, database node 120C issues a lease request 202 to lease manager node 160—that lease request 202 may identify a node ID 232 for database node 120C, a lock mode 145, and a database object ID 234 for the particular database object 115.

In response to receiving that lease request 202, in various embodiments, lease manager node 160 checks entries 230 for provisioned lease objects 150 that conflict with the requested lease object 150. In the illustrated embodiment, lease entries 230A and 230B correspond to the illustrated lease objects 150 of database node 120A and 120B, respectively, that allow for locks 140 to be created on the particular database object 115. Multiple database nodes 120 may hold lease objects 150 for the same database object 115 if those lease objects 150 do not conflict-database nodes 120A and 120B can hold the illustrated lease objects 150 on the same database object 115 at the same time as an access share lease object 150 does not conflict with another access shard lease object 150 on the same database object 115 in various embodiments. Lease manager node 160 may initially search lease entries 230 to discover entries having a database object ID 234 that matches the database object ID 234 of the received lease request 202. Thus, lease manager node 160 may identify lease entries 230A and 230B. Lease manager node 160 may then determine whether the lock mode 145 of lease entries 230A and 230B conflicts with the lock mode 145 specified in the received lease request 202. In various embodiments, access share conflicts with access exclusive, and thus lease manager node 160 determines that lease entries 230A and 230B (the corresponding lease objects 150) conflict with the lease object 150 requested in the received lease request 202. As such, lease manager node 160 may add database node 120A and 120B to a revocation list as it identifies conflicting entries. Once lease manager node 160 has identified the conflicting cases and added the corresponding database nodes 120 to the revocation list, lease manager node 160 may issue revoke requests 206 to the database nodes 120 on that revocation list—the revoke requests 206 may identify a lease object 150 or a combination of a lock mode 145 and a database object 115.

As depicted, database nodes 120A and 120B receive a revoke request 206. In response to the revoke request 206, a database node 120 may determine whether there are active locks 140 at the database node 120 that are associated with the lease object 150 that is being revoked. If there are active locks 140, then the database node 120 may wait until those active locks 140 are released by the transaction(s) 130 executing on that database node 120. In some instances, there are multiple local transactions 130 that hold a lock 140 created based on the lease object 150 being revoked—e.g., multiple transactions 130 might acquire an access share lock 140 on the same database object 115 and thus multiple locks 140 can be held on a database object 115 at the same time. In response to determining that there are no active locks 140 associated with the lease object 150 being revoked, a database node 120 may send a revoke response 208 that indicates that the lease object 150 has been released. In various embodiments, a database node 120 initially removes the lease object 150 from a local lease structure 165 to prevent additional locks 140 from being created, then waits for the actives locks 140 tied to that lease object 150 to be released, and then responds to lease manager node 160. Database node 120A and 120B each provide a revoke response 208 to lease manager node 160 (as shown) after releasing their respective lease object 150.

Once all the conflicting lease objects 150 have been revoked, lease manager node 160 may then provision the requested lease object 150. Accordingly, lease manager node 160 may add lease entry 230C to lease structure 165—lease entry 230C can specify the node ID 232 of database node 120C, lock mode 145A, and the database object ID 234 of the particular database object 115. As depicted, lease manager node 160 issues a lease response 204 to database node 120C that indicates that the requested lease object 150 has been provisioned. As such, database node 120C may add an entry to a local lease structure 165 at database node 120C and provision locks 140 of lock mode 145A to local transactions 130. In some embodiments, a database node 120 maintains a lease object 150 for a period of time until it expires (or is revoked)—that is, a lease object 150 may be assigned an expiration time. Accordingly, database node 120C might utilize the requested lease object 150 to create locks 140 until it expires at which point database node 120C is not permitted to create locks 140 under that lease object 150.

Figure 4B:
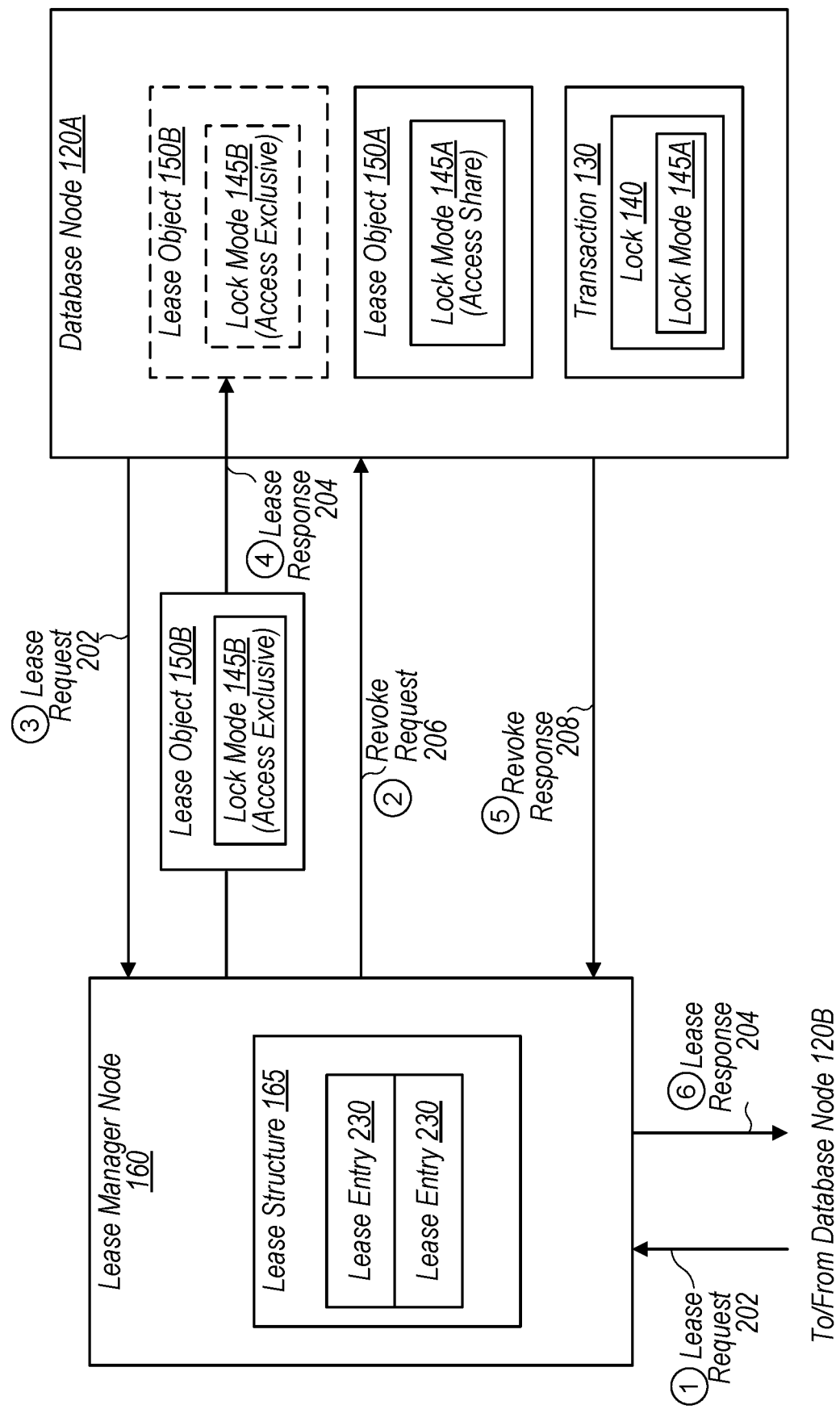

Turning now to FIG. 4B, a block diagram of another example provisioning and revoking lease objects 150 is shown. In the illustrated embodiment, there are database nodes 120A and 120B and lease manager node 160. As further shown, database node 120A initially includes a lease object 150A for a lock mode 145A that permits database node 120A to create locks 140 of lock mode 145A for its transactions 130. Also as shown, lease manager node 160 includes lease structure 165, which stores a set of lease entries 230.

During execution, a transaction 130 may acquire a first lock of a first lock mode 145 (e.g., lock mode 145A—access share) and later acquire, as part of that transaction 130, a second lock of a second, different lock mode 145 (e.g., lock mode 145B—access exclusive). Between the acquisition of the first lock and the second lock, a transaction 130 on another database node 120 may seek to acquire a conflicting lease object 150. In various embodiments, a transaction 130 does not release its locks 140 until it has been committed or aborted. To avoid unnecessary transaction abortions and since the first transaction 130 has to acquire the second lock in order to proceed so that it can be committed, in various embodiments, the first transaction 130 is permitted to acquire a lease object 150 for the second lock before the second transaction 130 even if the second transaction 130 requested a conflicting lease object 150 first. But in some cases, if the second transaction 130 is being prioritized (i.e., there is an urgency to commit the second transaction 130), then the first transaction 130 may be aborted so that it releases it locks 140 and the corresponding lease object 150 (that conflicts with the lease object 150 requested in association with the second transaction 130) can be revoked.

As depicted, database node 120B issues a lease request 202 for a particular lease object 150. Lease manager node 160 determines that lease object 150A conflicts with the requested lease object 150 and thus issues a revoke request 206 to database node 120A. Before revoking lease object 150A, database node 120A may receive a request from the illustrated transaction 130 for a lock 140 of lock mode 145B. In various embodiments, instead of immediately revoking lease object 150A as that transaction 130 would have to be aborted since it holds a lock 140 of lock mode 145A, database node 120A sends a lease request 202 to lease manager node 160 for lease object 150B and lease manager node 160 provisions lease object 150B and provides a lease response 204 as shown. Database node 120A may then provision the requested lock 140 of lock mode 145B to the illustrated transaction 130. Once that transaction 130 has committed and released its locks 140, database node 120A may then release lease objects 150A and 150B as lease object 150B may conflict with the lease object 150 requested by database node 120B. By allowing database node 120A to acquire lease object 150B before database node 120B acquires its lease object 150, database node 120A does not have to abort the illustrated transaction 130.

In some embodiments, however, if a different transaction 130 on database node 120A requests a lock 140 of lock mode 145B than a transaction 130 that acquired a lock 140 of lock mode 145A—that is, if lease object 150B would be associated with a different transaction 130 than a transaction 130 associated with lease object 150A—then database node 120A may first revoke lease object 150A in response to a revoke request 206 prior to sending a lease request 202 to lease manager node 160 for lease objects 150B. That is, the revoke response 208 that is labeled "5" in the sequence of events would be "3" while the lease request 202 that is labeled "3" would come after and be labeled "4" in the case in which lease object 150A and 150B are associated with different transactions 130.

Figure 5:
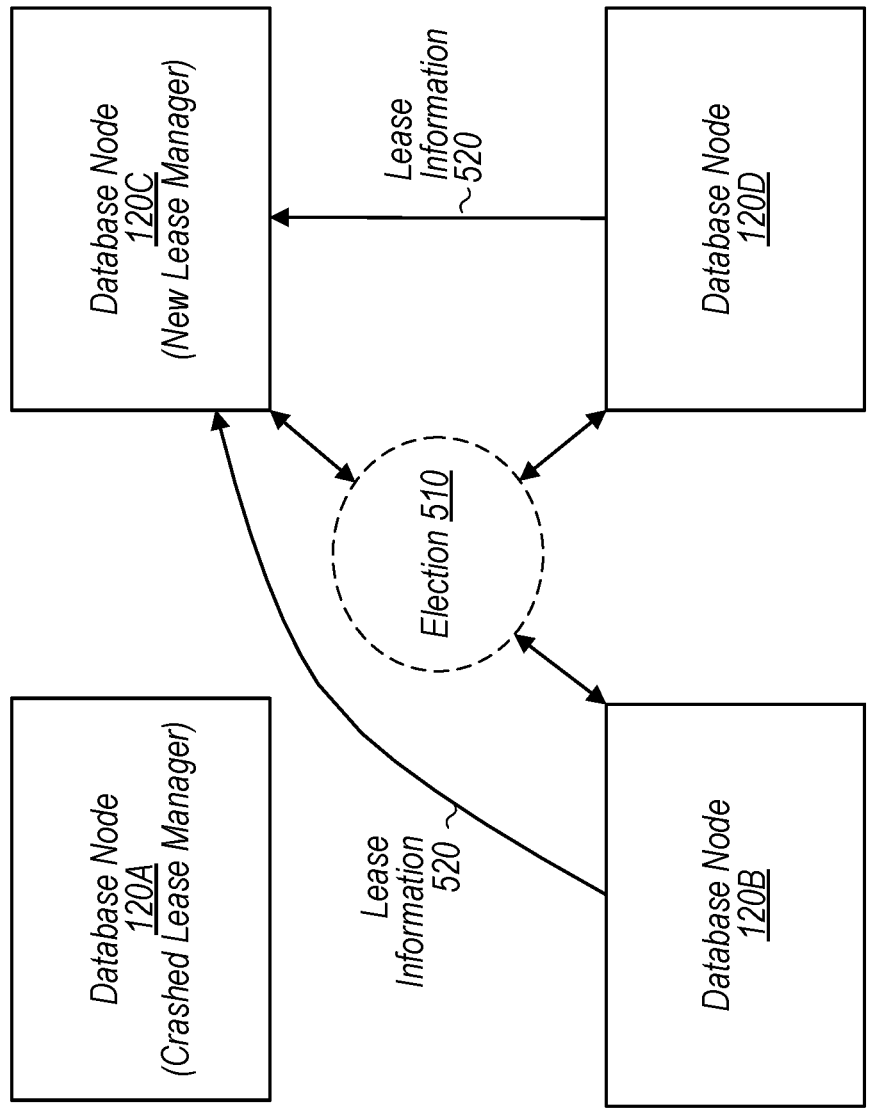
FIG. 5 is a block diagram illustrating an example election conducted to elect a new lease manager node to replace a crashed lease manager node, according to some embodiments.

Turning now to FIG. 5, a block diagram of one embodiment of an election conducted to elect a new lease manager node 160 to replace a crashed lease manager node 160 is shown. In the illustrated embodiment, there are database nodes 120A-D and database node 120A acts as lease manager node 160. During operation, database node 120A can crash or otherwise become unavailable to service lease requests 202 from other database nodes 120—e.g., database node 120A might crash due to a software bug or power loss. In response to the lease manager node becoming unavailable, in various embodiments, the remaining database nodes 120 conduct an election 510 to elect one of them to become the next lease manager node. Each database node 120 may execute an election module that can interface with the election modules executed on the other database nodes 120 to facilitate that election 510. In some cases, a database node 120 may detect that the lease manager node is unresponsive/has crashed and alert the other database nodes 120 in order to trigger election 510. A database node 120 may be elected in one or more different ways. For example, the database node 120 with the most available processing capacity to take on the role of lease manager may be elected. As another example, a database node 120 may be randomly selected or the database node 120 that is next in a defined node rotation may be elected. In the illustrated embodiment, database node 120C is elected to act as the new lease manager for the group/cluster of database nodes 120.

In response to a database node 120 being elected, in some embodiments, the remaining database nodes 120 provide lease information 520 to that database node 120 to reconstruct the lease structure 165 of the crashed lease manager. Accordingly, the lease information 520 of a given database node 120 may specify the lease objects 150 held by that database node 120. As a result of receiving lease information 520 from the other database nodes 120, the new lease manager node 160 may learn about the active lease objects 150 in the database cluster. In addition to this, the new lease manager node 160 can fence all the other database nodes 120 that did not send their lease information 520 and exclude them from the running cluster—this act of fencing ensures that no database node 120 is alive in the cluster that did not send its lease information 520 to the new lease manager node 160. In some embodiments, as a part of election 510, all database nodes 120 may release their lease objects 150 so that there are no active lease objects 150 when the new lease manager is elected. Thus, the new lease manager may not have to worry about the lease objects 150 that were provisioned by the crashed/previous lease manager. In yet some embodiments, the new lease manager sends revoke requests to the remaining database nodes 120 to instruct them to release all lease objects 150 that have been provisioned to them, clearing all the lease objects 150 that were provisioned by the crashed lease manager. After the new lease manager has learned about the lease objects 150 that were previously provisioned or the lease objects 150 have been revoked, the new lease manager may begin to service lease requests 202.

In some cases, a non-lease-manager database node 120 may crash (e.g., database node 120B) or it may be partitioned. If a non-lease manager database node 120 is partitioned, then lease manager node 160 may first fence that database node 120 so that it is guaranteed to crash and then may revoke all its lease objects 150 that were previously provisioned to that database node 120. Lease manager node 160 (i.e., database node 120C in the illustrated embodiment) may detect that the database node 120 has crashed and is no longer part of the database node cluster. Once lease manager node 160 detects that the database node 120 is no longer part of the cluster, it may revoke all lease objects 150 that were previously previsioned to that database node 120. If the database node 120 is reinstantiated, it may reobtain its lost lease objects 150 by sending lease requests 202 to lease manager node 160.

Figure 6:
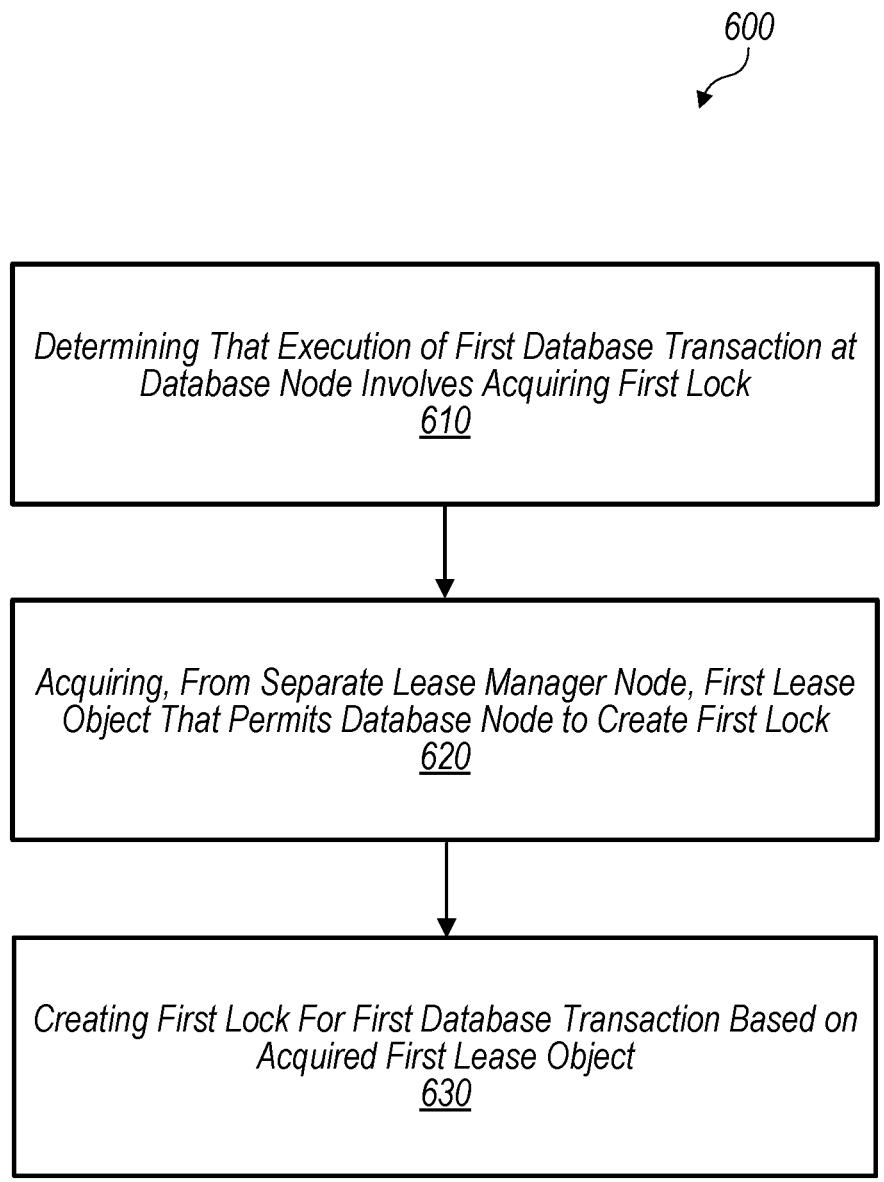
FIG. 6 is a flow diagram illustrating a method pertaining to obtaining a lease object to create a lock, according to some embodiments.

Turning now to FIG. 6, a flow diagram of a method 600 is shown. Method 600 is one embodiment of a method performed by a database node (e.g., a database node 120) in order to prevent inter-node lock conflicts between database nodes of a database system (e.g., system 100) and intra-node lock conflicts between database transactions (e.g., transactions 130) that are executed locally at the database node. Method 600 may be performed by executing a set of program instructions stored on a non-transitory computer-readable medium. Method 600 may include more or less steps than shown. For example, method 600 may include a step in which the database node releases a held lease object (e.g., a lease object 150) in response to receiving a revoke request.

Method 600 begins in step 610 with the database node determining that an execution of a first database transaction at the database node involves acquiring a first lock (e.g., a lock 140). The first lock may be associated with a first lock mode (e.g., a lock mode 145). In step 620, the database node acquires, from a separate lease manager node (e.g., lease manager node 160), a first lease object that permits the database node to create the first lock. The first lease object may permit the database node to create multiple locks associated with the first lock mode. In some cases, the first lock mode is an access share mode that permits concurrent access to a database object (e.g., a database table) by multiple database transactions. The separate lease manager node, in various embodiments, ensures that a lease object for creating a second lock that conflicts with the first lock is not held by another database node of the plurality of database nodes of the database system. At least another one of the plurality of database nodes may hold a second lease object associated with the first lock mode of the first lease object provided to the database node—e.g., the first and second lease objects might permit access share locks to be created on a particular database table. In some embodiments, the first lease object is assigned an expiration time at which point the first lease object is revoked such that the database node is not permitted to create locks under the first lease object—that is, the first lease object may become invalid after, for example, ten minutes.

In step 630, the database node creates the first lock for the first database transaction based on the acquired first lease object. In various embodiments, the creating includes ensuring that the first lock does not conflict with any lock held by another database transaction that is executing at the first database node. The database node may determine that an execution of a third database transaction involves acquiring a lock of the first lock mode. Based on multiple database transactions being permitted to hold a lock of the first lock mode at the same time, the database node may create, for the third database transaction and while holding the first lease object, a lock of the first lock mode. The first and third database transactions may hold a respective lock of the first lock mode at the same time. The database node may detect that the lease manager node has crashed and a new lease manager node has been provisioned, and then send a notification (e.g., a message including lease information 520) to the new lease manager node that the first lease object is held by the database node.

In some cases, the first lease object permits the database node to create locks on a first database object. The database node may acquire, from the lease manager node, a second lease object that permits the database node to create locks on a second database object. The first and second lease objects may be of the same lock mode. The database node may receive, from the lease manager node, a revoke request to release the first lease object. The database node may determine whether there are any active locks at the database node that are associated with the first lease object. Accordingly, the database node may release the first lease object in response to determining that there are no active locks associated with the first lease object. In some cases, the database node may detect that the lease manager node is unresponsive and conduct an election among the plurality of database nodes to elect a database node to become a lease manager node. In response to database node being elected, it may process requests from other ones of the plurality of database nodes for lease objects.

Figure 7:
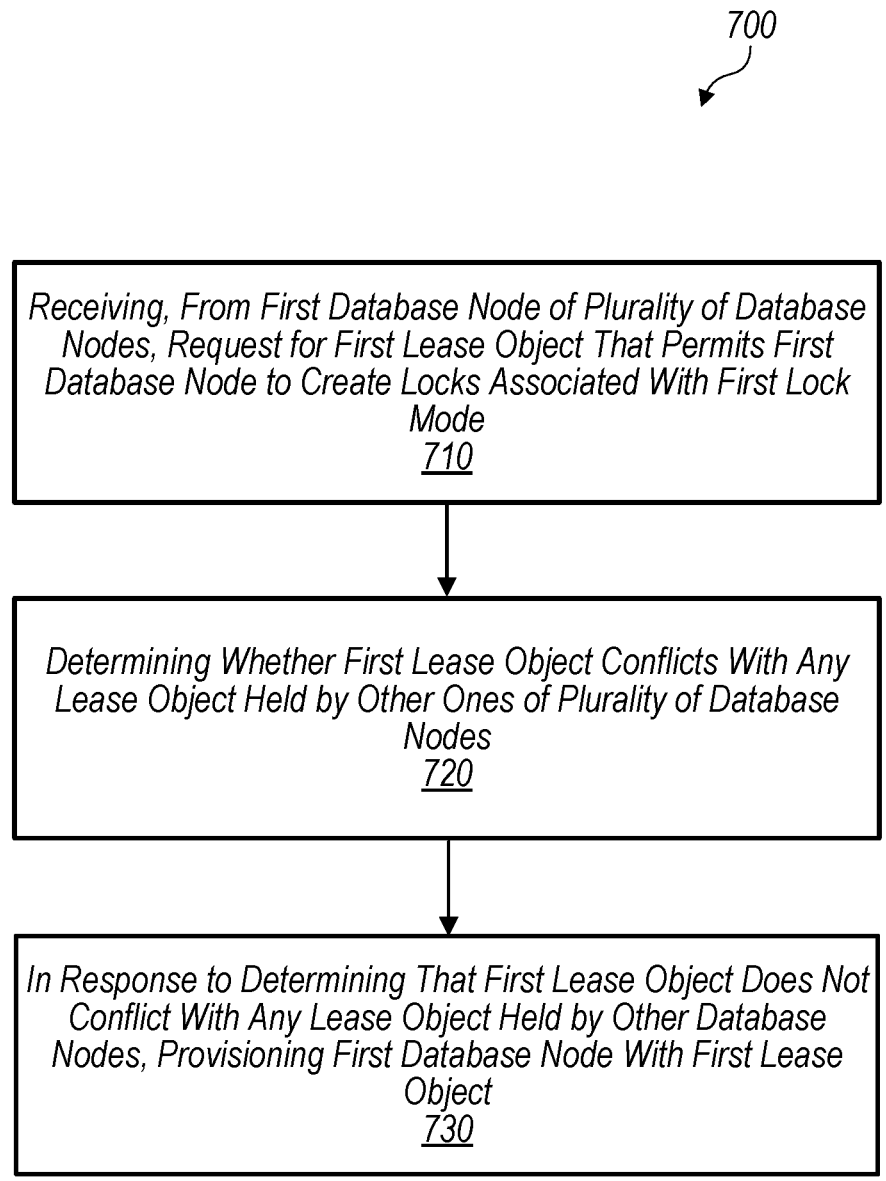
FIG. 7 is a flow diagram illustrating a method pertaining to provisioning a lease object to create a lock, according to some embodiments.

Turning now to FIG. 7, a flow diagram of a method 700 is shown. Method 700 is one embodiment of a method performed by a lease manager node (e.g., lease manager node 160) to provision a lease object (e.g., a lease object 150) for creating locks (e.g., locks 140). Method 700 may be performed by executing a set of program instructions stored on a non-transitory computer-readable medium. Method 700 may include more or less steps than shown.

Method 700 begins in step 710 with the lease manager node receiving, from a first database node of a plurality of database nodes (e.g., database nodes 120), a request (e.g., a lease request 202) for a first lease object that permits the first database node to create locks associated with a first lock mode (e.g., a lock mode 145). In step 720, the lease manager node determines whether the first lease object conflicts with any lease object held by other ones of the plurality of database nodes. In response to determining that a second lease object held by a second database node conflicts with the first lease object, the lease manager node may issue a request to the second database node to release the second lease object. In the case that lease objects held by at least two database nodes conflict with the first lease object, the lease manager node may issue requests to the at least two database nodes to release the lease objects.

In step 730, in response to determining that the first lease object does not conflict with any lease object held by the other database nodes, the lease manager node provisions the first database node with the first lease object. The provisioning may be performed after the lease manager node determines that the second lease object has been released. The first database node may be operable to ensure, when creating a lock for a database transaction based on the first lease object, that the lock does not conflict with any lock held by another database transaction executing at the first database node. In various embodiments, the lease manager node maintains a lease data structure (e.g., lease structure 165) that stores information that identifies lease objects that have been provisioned to ones of the plurality of database nodes. Based on detecting that the first database node has crashed, the lease manager node may update the information to indicate that the first lease object is no longer provisioned to the first database node.

In some embodiments, the lease manager node is one of the plurality of database nodes. As such, the lease manager node may determine that an execution of a first database transaction at the lease manager node involves acquiring a first lock. The lease manager node may then provision, to itself, a second lease object that permits the lease manager node to create the first lock. The provisioning may include ensuring that a lease object for creating a second lock that conflicts with the first lock is not held by another one of the plurality of database nodes. The lease manager node may then create the first lock for the first database transaction based on the acquired second lease object, including ensuring that the first lock does not conflict with a second lock held by a second database transaction executing at the lease manager node.

Exemplary Computer System

Figure 8:
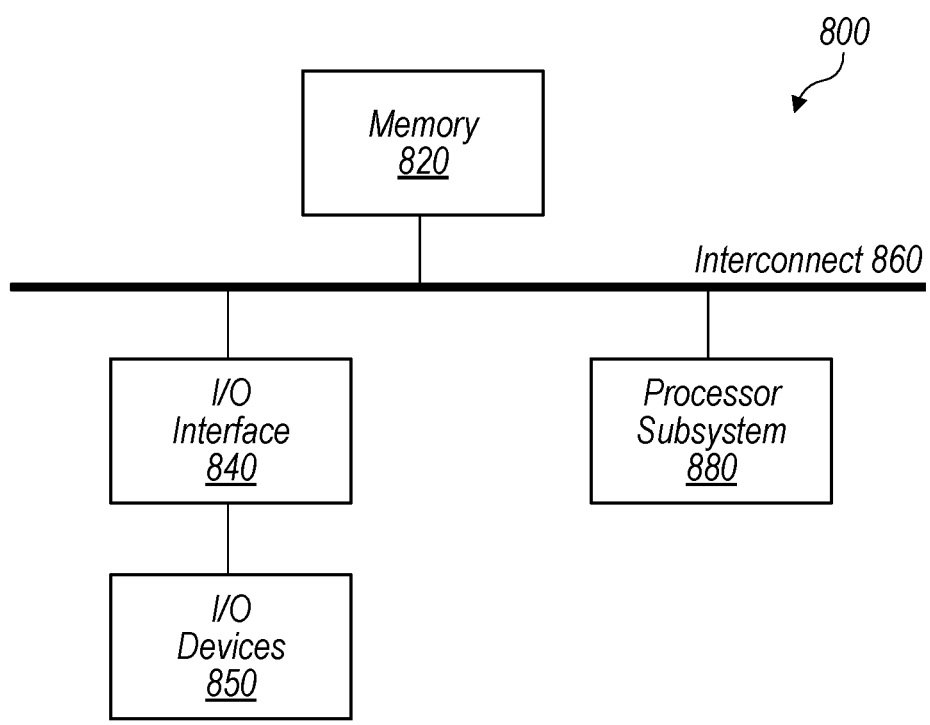
FIG. 8 is a block diagram illustrating elements of a computer system for implementing various systems described in the present disclosure, according to some embodiments.

Turning now to FIG. 8, a block diagram of an exemplary computer system 800, which may implement system 100, database 110, a database node 120, and/or lease manager node 160, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement receiver queue 212, sender queue 214, lease manager engine 220, and/or lock manager 310 are included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for preventing inter-node lock conflicts between a plurality of database nodes of a database system and intra-node lock conflicts between a plurality of database transactions within database nodes of the plurality of database nodes, the method comprising:
   determining, by a first database node of the plurality of database nodes, that an execution of a first database transaction at the first database node involves acquiring a first lock;
   acquiring, by the first database node and from a separate lease manager node, a first lease object that permits the first database node to create the first lock, wherein the separate lease manager node is operable to ensure that a lease object for creating a second lock that conflicts with the first lock is not held by a second database node of the plurality of database nodes; and
   creating, by the first database node, the first lock for the first database transaction based on the acquired first lease object, wherein the creating includes ensuring that the first lock does not conflict with any lock held by a different database transaction executing at the first database node.

2. The method of claim 1, wherein the first lock is associated with a first lock mode, and wherein the first lease object permits the first database node to create locks associated with the first lock mode.

3. The method of claim 2, further comprising:
   determining, by the first database node, that an execution of a third database transaction involves acquiring a lock having the first lock mode; and
   based on multiple database transactions being permitted to hold a lock of the first lock mode at the same time, the first database node creating, for the third database transaction and while holding the first lease object, a lock of the first lock mode, wherein the first and third database transactions hold a respective lock of the first lock mode at the same time.

4. The method of claim 2, wherein the first lock mode is an access share mode that permits concurrent access to a database object by multiple database transactions.

5. The method of claim 2, wherein at least another one of the plurality of database nodes holds a second lease object associated with the first lock mode that is associated with the first lease object provided to the first database node.

6. The method of claim 1, wherein the first lease object permits the first database node to create locks on a first database object, and wherein the method further comprises:
   acquiring, by the first database node and from the lease manager node, a second lease object that permits the first database node to create locks on a second database object.

7. The method of claim 6, wherein the first and second lease objects are associated with the same lock mode.

8. The method of claim 1, further comprising:
receiving, by the first database node and from the lease manager node, a revoke request to release the first lease object;
determining, by the first database node, whether there are any active locks at the first database node that are associated with the first lease object; and
releasing, by the first database node, the first lease object in response to determining that there are no active locks associated with the first lease object.

9. The method of claim 1, further comprising:
detecting, by the first database node, that the lease manager node has crashed and a new lease manager node has been provisioned; and
sending, by the first database node, a notification to the new lease manager node that the first lease object is held by the first database node.

10. The method of claim 1, wherein the first lease object is assigned an expiration time at which the first lease object is revoked such that the first database node is not permitted to create locks under the first lease object.

11. A non-transitory computer-readable medium having program instructions stored thereon that are capable of causing a first database node of a plurality of database nodes to perform operations comprising:
determining that an execution of a first database transaction at the first database node involves acquiring a first lock;
acquiring, from a lease manager node, a first lease object that permits the first database node to create the first lock, wherein the lease manager node is operable to ensure that a lease object for creating a second lock that conflicts with the first lock is not held by a second database node of the plurality of database nodes; and
creating the first lock for the first database transaction based on the acquired first lease object, wherein the creating includes ensuring that the first lock does not conflict with any lock held by a second database transaction executing at the first database node.

12. The non-transitory computer-readable medium of claim 11, wherein the operations further comprise:
creating, while the first lock is held by the first database transaction, a lock for another database transaction based on the first lease object allowing multiple database transactions to hold a lock of a lock mode associated with the first lease object at the same time.

13. The non-transitory computer-readable medium of claim 11, wherein the operations further comprise:
receiving a revoke request to lease the first lease object;
after receiving the revoke request, maintaining the first lease object for a period of time until there are no active database transactions at the first database node that hold a lock created based on the first lease object; and
after the maintaining, sending a notification to the lease manager node that the first lease object has been released.

14. The non-transitory computer-readable medium of claim 11, wherein the operations further comprise:
detecting that the lease manager node is unresponsive;
conducting an election among the plurality of database nodes to elect a database node to become a lease manager node; and
in response to the first database node being elected, processing requests from other ones of the plurality of database nodes for lease objects.

15. A non-transitory computer-readable medium having program instructions stored thereon that are capable of causing a lease manager node to perform operations comprising:
receiving, from a first database node of a plurality of database nodes, a request for a first lease object that permits the first database node to create locks associated with a first lock mode;
determining whether the first lease object conflicts with any lease object held by other ones of the plurality of database nodes; and
in response to determining that the first lease object does not conflict with any lease object held by the other database nodes, provisioning the first database node with the first lease object, where the first database node is operable to ensure, when creating a lock for a database transaction based on the first lease object, that the lock does not conflict with any lock held by another database transaction executing at the first database node.

16. The non-transitory computer-readable medium of claim 15, wherein the operations further comprise:
in response to determining that a second lease object held by a second database node conflicts with the first lease object, issuing a request to the second database node to release the second lease object; and
subsequent to determining that the second lease object has been released, provisioning the first database node with the first lease object.

17. The non-transitory computer-readable medium of claim 15, wherein the operations further comprise:
maintaining a lease data structure that stores information identifying lease objects that have been provisioned to ones of the plurality of database nodes; and
based on detecting that the first database node has crashed, updating the information to indicate that the first lease object is no longer provisioned to the first database node.

18. The non-transitory computer-readable medium of claim 15, wherein the operations further comprise:
in response to determining that lease objects held by at least two database nodes conflict with the first lease object, issuing requests to the at least two database nodes to release the lease objects; and
subsequent to determining that the lease objects have been released, provisioning the first database node with the first lease object.

19. The non-transitory computer-readable medium of claim 15, wherein the operations further comprise:
provisioning at least two database nodes with a lease object that permits the at least two database nodes to create locks associated with compatible lock modes.

20. The non-transitory computer-readable medium of claim 15, wherein the lease manager node is one of the plurality of database nodes, and wherein the operations further comprise:
determining that an execution of a first database transaction at the lease manager node involves acquiring a first lock;
provisioning, to the lease manager node, a second lease object that permits the lease manager node to create the first lock, wherein the provisioning includes ensuring that a lease object for creating a second lock that conflicts with the first lock is not held by another one of the plurality of database nodes; and
creating the first lock for the first database transaction based on the acquired second lease object, wherein the creating includes ensuring that the first lock does not conflict with a second lock held by a second database transaction executing at the lease manager node.

\* \* \* \* \*